UNITED STATES PATENT OFFICE.

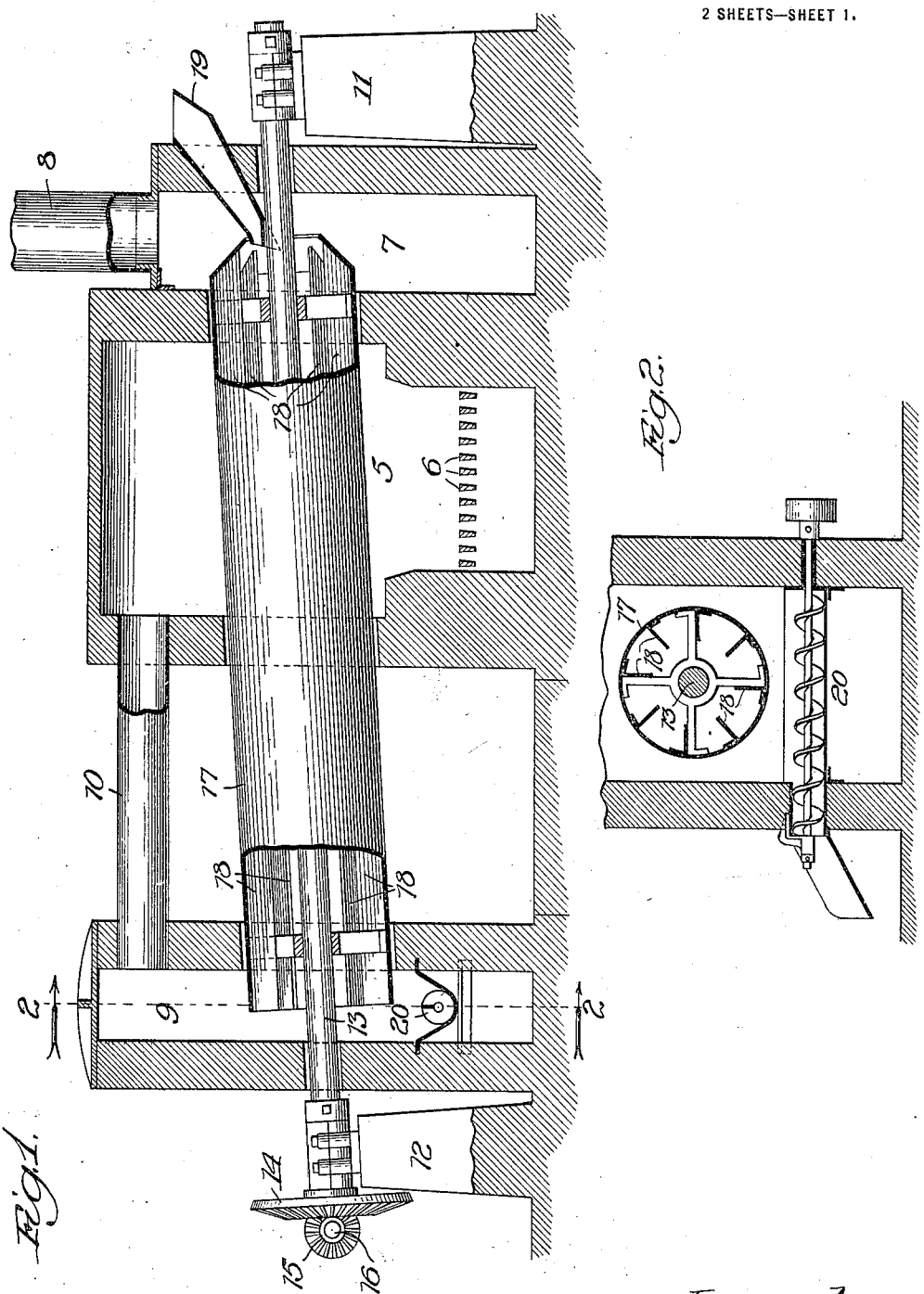

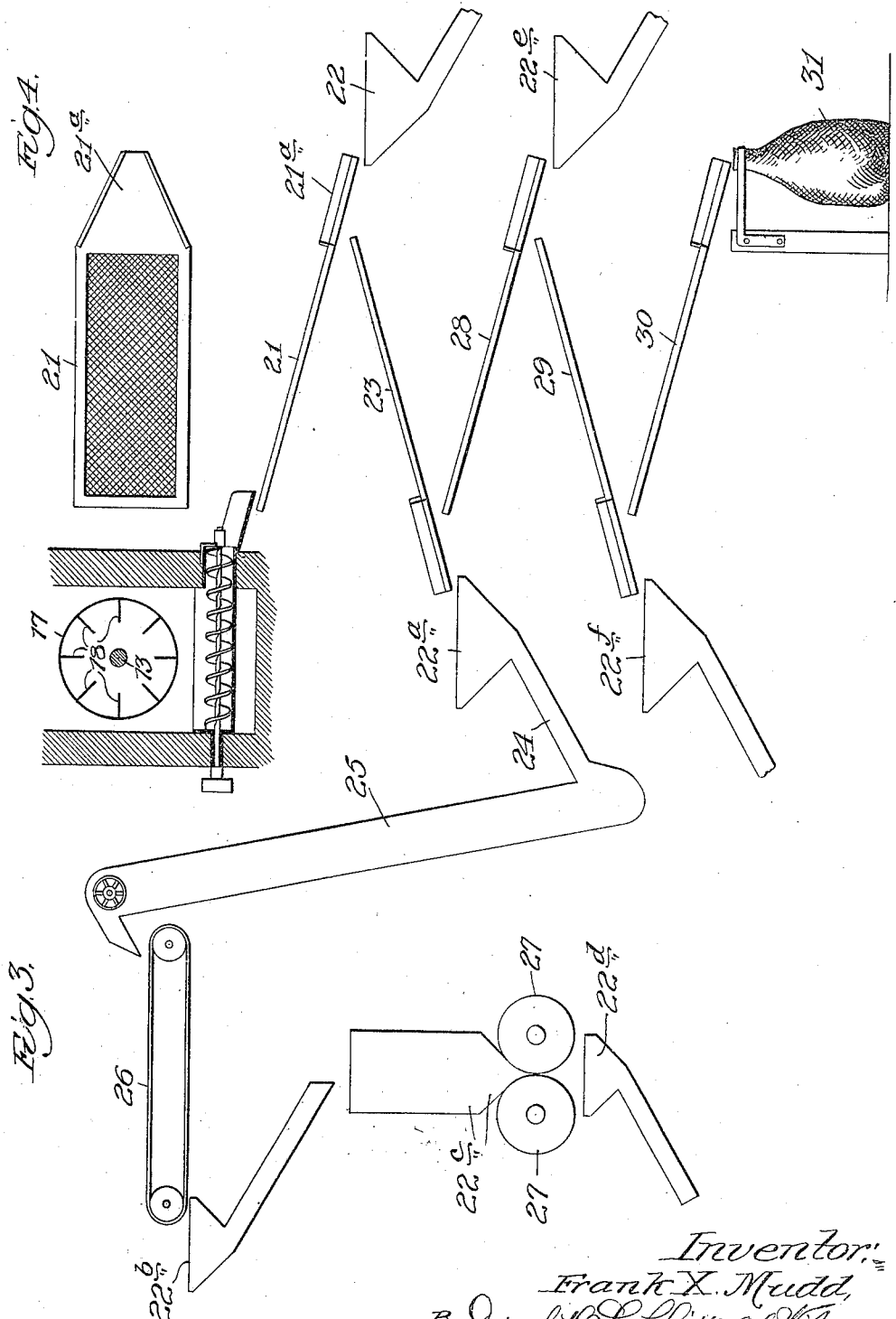

FRANK X. MUDD, OF CHICAGO, ILLINOIS.

METHOD OF PREPARING COMMERCIAL FERTILIZER FROM POULTRY-MANURE.

1,320,405.   Specification of Letters Patent.   Patented Nov. 4, 1919.

Application filed July 7, 1919. Serial No. 309,081.

*To all whom it may concern:*

Be it known that I, FRANK X. MUDD, a citizen of the United States, residing at 343 South Dearborn street, Chicago, in the county of Cook and State of Illinois, have invented a new and useful Improvement in Methods of Preparing Commercial Fertilizer from Poultry-Manure, of which the following is a specification.

To prepare for the market poultry manure, which is a superior fertilizer, it should be dried and pulverized to adapt it to be shipped in bags or other containers and for use.

A prolific source of supply of this variety of manure is the coops in live-poultry shipping cars, from which it is the practice, in cleaning the coops, to dump the manure in heaps along the railroad track, where it is accessible for gathering in large quantities. In that condition much foreign matter, such as stones, pieces of metal, as nails and scrap, and other substances, become mixed with the manure; and, besides, much feed, especially corn and wheat, wasted in the coops by the poultry in feeding, becomes mixed with the manure and with the other foreign matter referred to, in the aforesaid heaps.

It is the purpose of my improved treatment to provide in a continuous operation this superior article of fertilizer from the particular source mentioned as well as from other source of supply, in marketable condition, not only properly dried and pulverized, but freed from all foreign matter and with the waste grain salvaged from the mixture in suitable condition for re-use as feed for poultry and for animals, especially for hogs.

The accompanying drawings illustrate apparatus suitable for practising my improved treatment of poultry-manure.

Figure 1 is a view in side elevation, partly broken and sectional, of the drier; Fig. 2 is a broken section on line 2—2, Fig. 1; Fig. 3 is a diagrammatic illustration of further apparatus employed in the practice of my improved method, and Fig. 4 is a plan view of one of the several screening devices so employed.

The drier shown comprises a furnace-structure (Fig. 1) having a combustion-chamber 5 provided with a grate 6. A chamber 7 is built on one end of the furnace and has a stack 8 rising from it; and a chamber 9 is provided at the opposite furnace-end in spaced relation to the furnace, with the upper part of which the corresponding end of the chamber 5 is connected by a flue 10. Bearings 11 and 12 are provided respectively adjacent the chambers 7 and 9 for the opposite ends of a rotatable shaft 13 supported to extend inclinedly through the walls of the chamber 7, combustion-chamber 5 and chamber 9, and carrying on its end adjacent to the last-named chamber a beveled gear 14 for rotating the shaft by a pinion 15 on a shaft 16 to be driven by suitable power. A drum 17, supported on the shaft 13 to rotate with it, extends inclinedly through the combustion-chamber and, at its open discharge-end, into the chamber 9, the drum having longitudinal stirrer-blades 18 projecting into it at intervals about its inner surface, and being provided at its opposite end with a feed-chute 19 extending through the outer wall of the chamber 7.

With fire in the furnace, and the drum being slowly rotated, the green poultry-manure to be treated is fed through the chute 19 into the higher end of the drum and is stirred by the blades therein in the rotation, and gradually moved by them toward the opposite drum-end. In thus passing through the drum the manure is subjected to drying by the furnace-heat and by contact with the products of combustion, which pass from the combustion-chamber through the flue 10 and chamber 9 into the drum and course through the latter in the direction counter to that of the manure, escaping by way of the chamber 7 to the stack. In this manner the manure is thoroughly dried and discharges from the lower drum-end into the chamber 9 to a conveyer 20 in the bottom of the latter. In that dried condition the manure contains numerous bumps, which should be re-run through the drum for disintegrating them, and it also contains whole grain (particularly corn and wheat) in quantity which warrants saving it, and metallic matter which should be removed. Furthermore, for commercial handling and use as fertilizer, the manure is required to be in more or less finely pulverized condition, which may be partially effected by screening, though the bulk requires to be further reduced to properly pulverize it.

All of these results are accomplished by my treatment of the dried manure after it is discharged from the drier, From the conveyer 20 the discharge is to an inclined screen 21 of a mesh to intercept the aforesaid lumps, including any stones, and direct them through the tapering conveyer-end 21ª into a hopper 22, whence they may be returned to the drum 17, after taking out the stones. The several additional screens hereinafter described are all inclined, as represented, and of the same construction as that of the screen 21 with its tapering discharge-end 21ª. The material passed through the screen 21 falls upon the next lower screen 23 of relatively smaller mesh, and that portion which is too coarse to pass through it, and which forms the bulk of the dried article, discharges into a hopper 22ª, whence it goes through an inclined chute 24 to an elevator 25 and is delivered thereby to a magnetic separator indicated at 26, which removes the metallic substances from such bulk; and the latter discharges from the separator into a hopper 22ᵇ, from which it feeds through a hopper 22ᶜ to a suitable grinder indicated at 27, which reduces it to the desired degree of fineness and from which it discharges through a hopper 22ᵈ to a suitable receptacle, such as a bag, (not shown). The next succeeding screen 28 is of a mesh to intercept corn in the dried article passing through the screen 23. The corn discharges down that screen into a hopper 22ᵉ, whence it may run into any suitable receptacle (not shown). The fine material passing through the screen 28 contains wheat and falls on the next succeeding screen 29, of a mesh to intercept the wheat which discharges into a hopper 22ᶠ; and the material which passes through the screen 29 is of the required degree of fineness to constitute the finished fertilizer, as is that acted on by the aforesaid grinder, and drops upon an inclined chute 30, like the screens already described except that it is imperforate, and from which it may discharge into a suitable receptacle, such as the bag indicated at 31.

The grain thus reclaimed is considerable, sometimes amounting to about a bushel obtained from each ton of the manure treated; and the price obtained from its sale materially reduces the cost of the described treatment.

I claim:

1. The method of preparing, in a continuous operation, commercial fertilizer from poultry-manure, which consists in drying the green manure, screening out of the fine portion of the dried product the grain contained therein, and gathering said fine product and the grain screened therefrom.

2. The method of preparing, in a continuous operation, commercial fertilizer from poultry-manure, which consists in drying the green manure, screening the fine from the coarse portion of said dried product and reducing the coarse product to the degree of fineness required for the fertilizer, screening from said fine product the grain contained therein, and gathering said fine product and the grain screened therefrom.

3. The method of preparing, in a continuous operation, commercial fertilizer from poultry-manure, which consists in drying the green manure, screening lumps out of the resultant dried product and separating the coarse from the fine portion thereof, reducing said coarse product to the degree of fineness required for the fertilizer, screening from said fine product corn and then wheat, contained therein, and gathering said fine product and the wheat screened therefrom.

FRANK X. MUDD.

Copies of this patent may be obtained for five cents each, by addressing the "Commissioner of Patents, Washington, D. C."